United States Patent [19]

Leiber et al.

[11] 4,288,127

[45] Sep. 8, 1981

[54] ANTI-LOCK CONTROL SYSTEM

[75] Inventors: Heinz Leiber, Leimen; Wolf-Dieter Jonner, Sandhausen; Hermann-Josef Goebels, Schwieberdingen, all of Fed. Rep. of Germany

[73] Assignee: Robert Bosch GmbH, Stuttgart, Fed. Rep. of Germany

[21] Appl. No.: 53,653

[22] Filed: Jun. 29, 1979

[30] Foreign Application Priority Data

Jul. 13, 1978 [DE] Fed. Rep. of Germany ....... 2830809

[51] Int. Cl.³ .............................................. B60T 8/10
[52] U.S. Cl. ................................................... 303/111
[58] Field of Search ................ 303/93, 100, 109, 111, 303/113, 119

[56] References Cited

U.S. PATENT DOCUMENTS 4,005,911 2/1977 Klatt et al. ........................... 303/111
4,088,376 5/1978 Lindemann et al. ............ 303/111 X Primary Examiner—Duane A. Reger
Attorney, Agent, or Firm—Edwin E. Greigg

[57] ABSTRACT

The invention relates to an anti-lock control system for vehicle brakes actuated by a pressure medium, in which a signal transducer is associated with each wheel of one axle for the purpose of obtaining a signal characterizing the wheel motion behavior, these signals being supplied to an evaluator circuit which, on the basis of these signals, generates brake pressure control signals and including brake pressure control devices for the separate influencing of the brake pressure on the two wheels to which these brake pressure control signals are supplied with the evaluator circuit containing control means which in the event of a pressure drop on one wheel prevent a substantial pressure increase on the other wheel and in the event of a subsequent pulsated pressure increase on the first wheel also permit only a synchronously pulsated pressure buildup on the other wheel.

8 Claims, 12 Drawing Figures

ANTI-LOCK CONTROL SYSTEM

BACKGROUND OF THE INVENTION

An anti-lock control system of the type to which the invention is directed is known from the German Offenlegungsschrift No. 23 20 559. In this German patent, steps are taken for preventing serious yawing moments at the onset of braking in the event of hard braking, when the wheels of one axle are traveling on a road surface having widely varying coefficients of friction. After a rather long braking period, however, large pressure differences appear in this arrangement, and thus yawing moments arise.

OBJECT AND SUMMARY OF THE INVENTION

The object of the present invention is to reduce further the amount of yawing moment arising in the situation described above and to limit it over the entire course of braking. It is also intended to keep the apparatus cost for attaining this object at a low level.

With the apparatus described above as a point of departure, this object is attained in accordance with the invention in that the branching point of the line from the pressure source to the wheel brakes is disposed either in the immediate vicinity of the brake pressure control devices or within these devices themselves.

In this case, the brake pressure in the first wheel can rise during a pressure buildup only to the extent of a certain pressure difference above the brake pressure in the other wheel. Because this pressure difference is dependent on the flow resistance of the common line, the pressure difference can be affected by means of appropriate throttling of the tubular cross-section of this section of the line or by appropriate measurement of the flow resistances of the parts after the branching point as compared with the common section of line. Preferably the flow resistance of the common section is at least as great as the flow resistance of one part after the branching point. Because tubular lines, beyond a certain length, can be considered pressure reservoirs, it is necessary to define the location of the branching point in the previously described manner.

In hard braking on a road surface having widely varying coefficients of friction between the two wheels of one axle, the higher braking force on one side when the braking forces transmissible to both sides are fully utilized causes a severe yawing moment, which sharply reduces the braking stability, particularly in vehicles having a short wheelbase.

The asymmetrical braking forces thus appearing may be so great that even with a quick steering reaction on the part of the driver, the vehicle cannot be controlled, so that tracking loss and slewing are the result.

Even with self-stabilizing sterring, as in vehicles having a negative steering roll radius, a vehicle with a short wheelbase and a low rear-axle load could hardly be controlled by the driver.

Braking with secure tracking, under critical road surface conditions and while driving around sharp curves, can be attained only by means of a limited utilization of the higher braking force on one side in the event of asymmetrical braking forces.

In accordance with the invention, i.e., the particular arrangement and measurement and synchronous triggering of the brake pressure devices, the required, limited utilization of the higher braking force on one side is automatically provided by means of the self-adjusting, maximum attainable pressure difference between the individual brake cylinders.

The desired limitation of the pressure difference in the individual brake cylinders is accomplished in that brief pressure elevation pulses, which are directed out to the brake pressure control devices associated with the individual brake cylinders in equal phases (synchronously), lead, as a result of the particular arrangement and measurement, in an inverse proportion to a pressure increase in the individual brake cylinders, depending on the pressure level there at the time. That is, in the brake cylinder to which the lower brake pressure level is directed, the larger pressure increase takes place proportionally.

Because a pressure difference between the individual brake cylinder pressures substantially determined by the dimensions of the flow resistances (throttles) is thereby established, then no further pressure increase, beyond this pressure difference, is attainable in the brake cylinder having the higher pressure level. Accordingly, an adaptation to this pressure difference is also automatically provided when, because of changes in the coefficient of friction, the asymmetrical braking forces are inverted.

The invention is applicable to air brakes and to hydraulic brakes. However, it is of particular interest to air brakes.

The combination in accordance with the invention can be used when there are one inlet and outlet valve for each wheel brake. Disposition of the parts here must necessarily be in the immediate vicinity of the branching point. However, the combination can also be used in a valve arrangement in which there is a valve placed in the brake line before the branching point to the two wheel brakes. Such a valve, in its first position, connects the brake pressure source with the wheel brakes. In its second position, this valve interrupts this connection and furnishes a connection between the wheel brakes and a return line. This is accomplished also in a valve arrangement wherein there is one 2/2-way valve each placed in the two lines leading to the wheel brakes, of which each one, in its first position, keeps the line open and, in its other position, blocks the line. In this case, the branching point may be disposed directly in the valve.

Both valve combinations can be integrated in one valve arrangement.

It was noted above that during the pressure drop on one wheel brake, the pressure on the other wheel brake should be maintained substantially constant when no control signal is available for the second wheel brake. However, this expression, "maintained substantially constant", is understood to include not only maintenance at a purely constant level, but also a brief pressure drop and thereafter maintenance at a constant level. This brief pressure drop may also be made dependent on the vehicle velocity. It will be used, in particular, only on the first control cycle. It is also possible to provide the pressure drop for a predetermined period only when a pressure drop has previously occurred on the controlled wheel over a predetermined period.

The control means are preferably embodied in such a manner that the pressure on the wheel brake of the second wheel, while the pressure on the wheel brake being controlled is kept constant, is either maintained similarly at a constant level or is elevated once in a pulselike fashion and thereafter is kept constant. The noted brief elevation may take place either at the end of the pressure reduction phase on the other wheel, or else at a predetermined period after the end of the pressure reduction. The possibilities discussed here may also be combined and a brief pressure buildup may be permitted up to a predetermined vehicle velocity, and above this velocity a brief pressure reduction may be undertaken during the pressure reduction on the controlled wheel.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 4b illustrates the associated pressure curve of the arrangement of FIG. 4a;

DESCRIPTION OF THE PREFERRED EMBODIMENTS

Figure 1A:
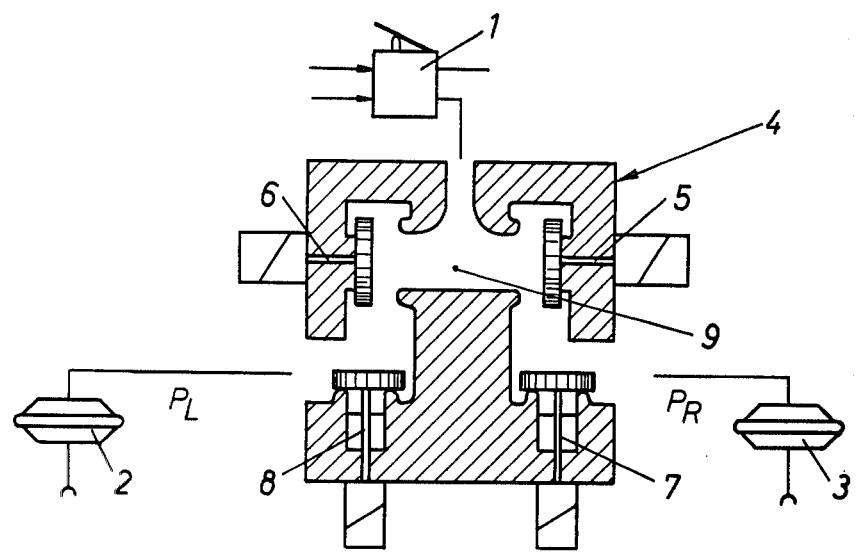
FIG. 1a is a schematic illustration of a pneumatic brake system constructed in accordance with the invention.

In FIG. 1a, a brake control valve 1 is shown, with which compressed air can be directed to the brakes 2 and 3 of the wheels of one axle. In order to control the brake pressure in the event of a tendency to lock, an integrated valve arrangement 4 is provided, which includes two inlet valves 5 and 6 and two outlet valves 7 and 8. The valve arrangement is arranged such that the branching point to the wheel brakes is disposed within the the valve itself. The inlet cross-section here is embodied as a throttle.

Figure 1B:
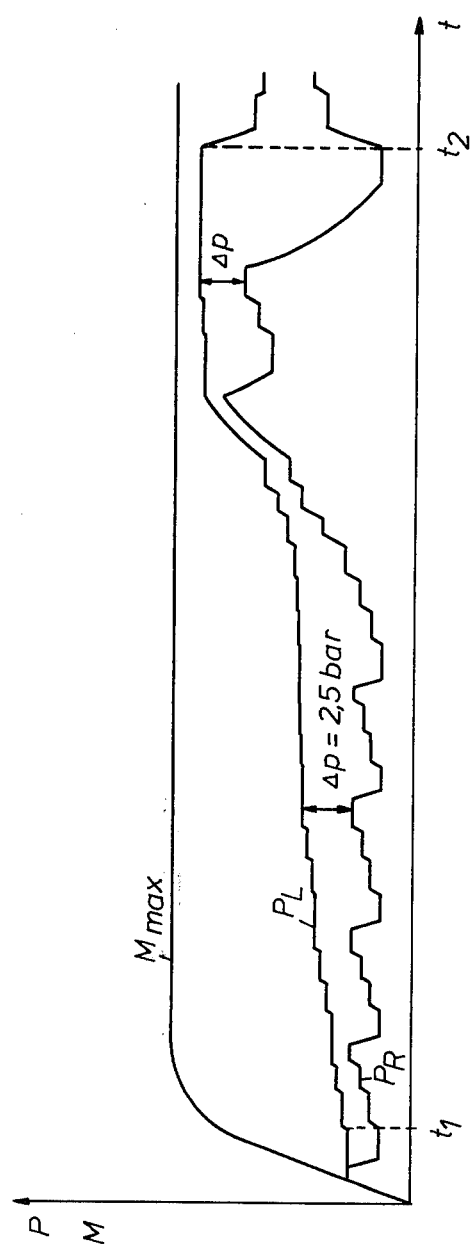
FIG. 1b illustrates an associated pressure curve at the wheel brakes.

If it be assumed that the right wheel arrives upon a surface having a low $\mu$ (coefficient of friction) and, upon braking, the pressure of this brake is controlled. FIG. 1b shows that during the pressure reduction and maintenance at a constant level on the right wheel (curve $P_R$), the pressure $P_L$ on the other wheel is kept constant (up to $t_1$) and that thereafter both are pulsated upward in common. On account of the ratios selected, the heights of the pressure steps of the right wheel are greater than those of the left wheel, so that the pressure curves $P_R$ and $P_L$ each approach each other up to a differential pressure $\Delta p$ of, for instance, 2.5 bar.

It is of further interest in this connection that when there is a high pressure difference occasioned by the control system (such as at $t_2$), with the subsequent pressure elevations on the right wheel, the pressure on the left wheel eases toward the brake of the right wheel because of the throttle ratios; that is, a pressure variation comes about in a contrary direction, although only the inlet valves 5 and 6 are actuated and not any outlet valve.

Figure 2:
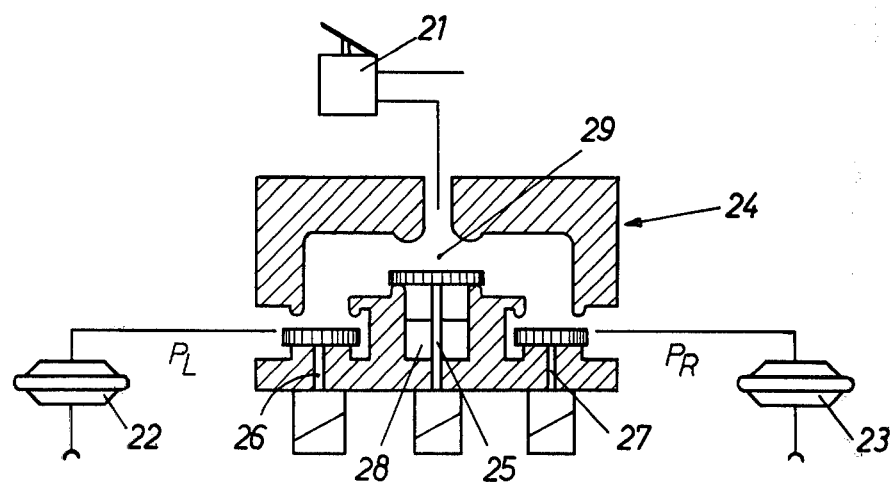
FIG. 2 is a schematic illustration of a different pneumatic brake system constructed in accordance with the invention.

In FIG. 2, as compared with FIG. 1a, a different valve arrangement 24 is provided in that only three valves are provided, of which the valve 25, upon its actuation, prevents the flow of compressed air from the brake valve 21 to the wheel brakes and connects them with an outlet 28. The valves 26 and 27 are blocking valves, whose triggering enables the interruption of the pressure drop and pressure rise on the individual wheel brakes. Here, as well, the inlet 29 is throttled. With the valve arrangement of FIG. 2, the same pressure curve as in the embodiment of FIG. 1a can be attained.

Figure 3:
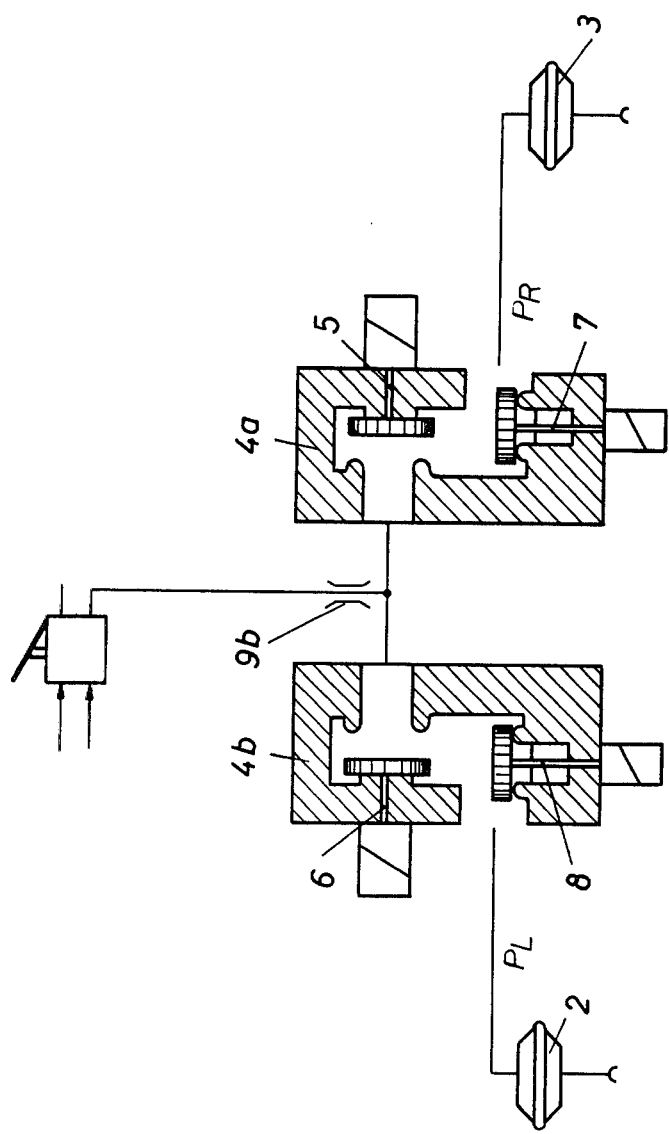
FIG. 3 is a schematic illustration of a derivation of the system of FIG. 1a having a single-valve arrangement.

The embodiment of FIG. 3 differs from that of FIG. 1a only in that the valves 5-8 are disposed in two valve arrangements 4a and 4b and there is a line throttle 9b therebetween.

In FIGS. 1a, 2 and 3, pneumatic brake systems are assumed. However, hydraulic circuits may also be used, and it is a matter of complete indifference whether these are full-power circuits or some other kind of hydraulic circuits. As has already been noted, the throttle restrictors may, as in FIG. 3, also be disposed in the lines (and not in the valves). This is particularly necessary when valves including 2/2-way valves are first placed downstream behind the branching point.

Figure 4A:
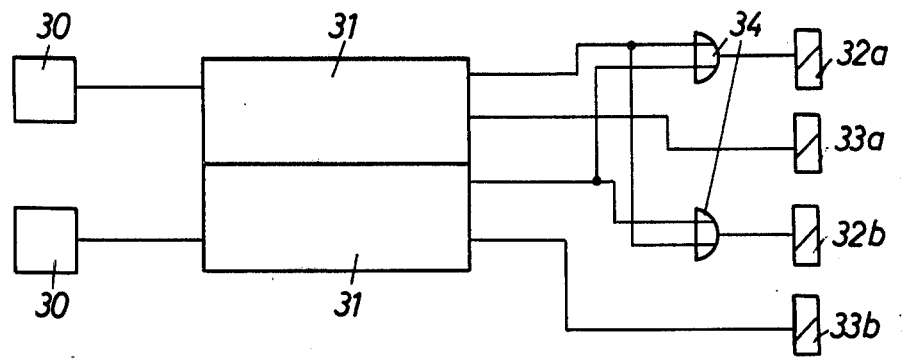
FIG. 4a is a block circuit diagram of an anti-lock controller constructed in accordance with the invention.

FIG. 4a shows a block circuit diagram of the anti-lock controller as is required for the control of the valve 4 of FIG. 1a. The measurement transducers associated with the two wheels for monitoring their wheel motion behavior are designated by reference numeral 30 and the evaluator circuits for these signals are designated 31. The evaluator circuits 31, via OR-gates 34, control inlet valves 32a and 32b (which may correspond, for example, to valves 5 and 6 of FIG. 1a) and outlet valves 33a and 33b (corresponding, for example to valves 7 and 8 of FIG. 1a).

Figure 4B:
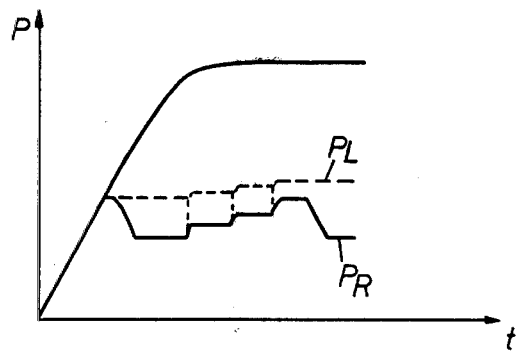

The inlet valves 32a and 32b are connected to each other via the OR-gates 34, so that as FIG. 4b shows and in accordance with FIG. 1a, during the maintenance of constant pressure and the pressure reduction on the controlled wheel ($P_R$), the pressure on the other wheel as well is built up stepwise, albeit with a reduced step height.

Figure 5A:
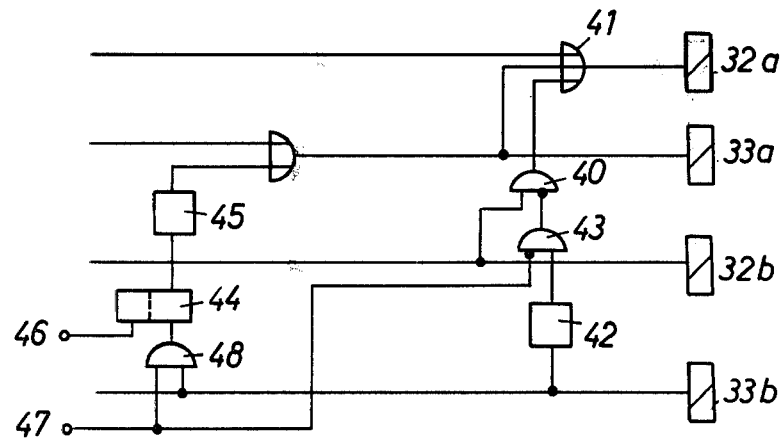
FIG. 5a is a block circuit diagram of an anti-lock controller.

In the embodiment of FIG. 5a, only the four lines leading to the valves 32a and 32b and 33a and 33b are shown, with a different linkage among these lines. In the linkage shown at right, the signals of the line leading to the inlet valve 32b proceed, as in FIG. 4a, via the AND-gate 40 and OR-gate 41 to the inlet valve 32a, i.e., the valve 32a generally follows the signals of the valve 32b, as in FIG. 4a.

Figure 5B:
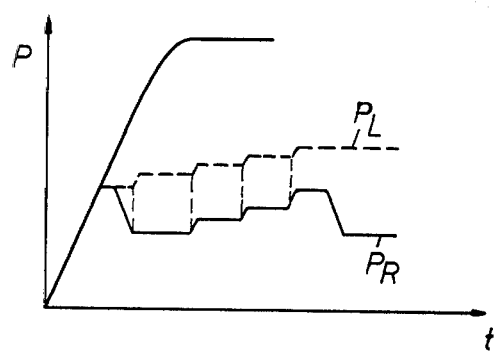
FIG. 5b is an associated pressure curve for the invention.
Figure 5C:
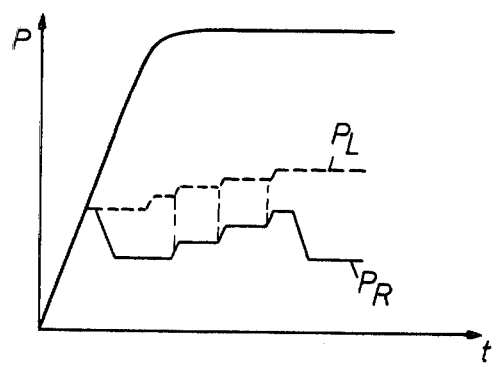
FIG. 5c is another associated pressure curve for the invention

It may, however, also be effective to undertake a one-time, step-shaped pressure increase on the other wheel after the pressure drop and during the maintenance of constant pressure on the controlled wheel. To this end, the timing member 42 is provided, which responds to the trailing edge of the pressure drop signal fed to the valve 33b and then, for a predetermined period, produces a signal which blocks the AND-gate 40 via the AND-gate 43 (inversion) and thus, for the predetermined period, does not permit the valve 32a to respond so as to allow the pressure to increase during this period. This is shown in the pressure curve of FIG. 5b. If the timing member also has a delay period, then, as shown in FIG. 5c, the pressure buildup step begins in a delayed manner.

Figure 5D:
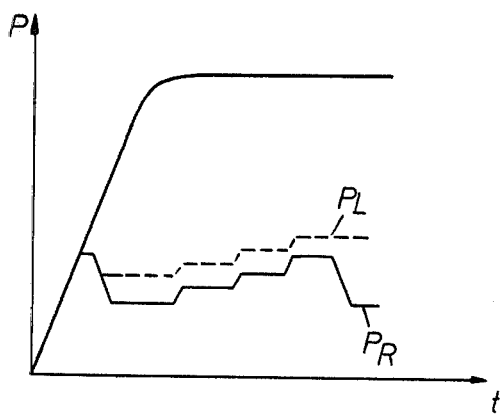
FIG. 5d is still another associated pressure curve for the invention.
Figure 5E:
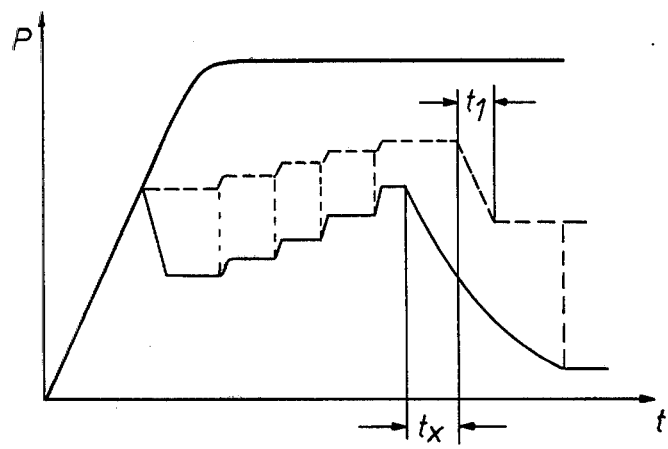
FIG. 5e shows still another associated pressure curve for the invention.

The second linkage shown effects a brief pressure reduction on the non-controlled wheel as well whenever pressure is reduced on the other wheel. This is shown by the pressure curve of FIg. 5d. Here, the bistable element 44 is set with the reduction signal to the valve 33b and by means of the forward edge of this reduction signal, the monostable element 45 is triggered which for a brief period, triggers the valve 33a (and 32a) so as to briefly reduce pressure. After a one-time setting of the bistable element 44, a reduction signal to the valve 33b can no longer trigger the monostable element 45; that is, the pressure reduction is permitted only in the first control cycle. The resetting of the bistable element 44 takes place at the end of braking via terminal 46. When the setting of the bistable element 44 takes place with a delay in time, then pressure is reduced on the non-controlled wheel only when the pressure drop on the controlled wheel exceeds a minimum duration as shown in the pressure curve of FIG. 5e.

The two linkages of FIG. 5a may be used alternatively. However, as is shown in FIG. 5a, they can also be used together, and then a signal which appears at terminal 47 at a vehicle velocity, for instance, of greater than 30 km per hour blocks the pressure buildup via AND-gate 43, i.e., it permits the buildup only at low velocity, while this signal permits the pressure reduction in accordance with FIG. 5d via the AND-gate 48.

It is only for the sake of simplicity that linkages are shown only between the lines to the valves 32b and 33b and the lines to the valves 32a and 33a and not the reverse linkages as well, which are of the same kind.

Figure 6:
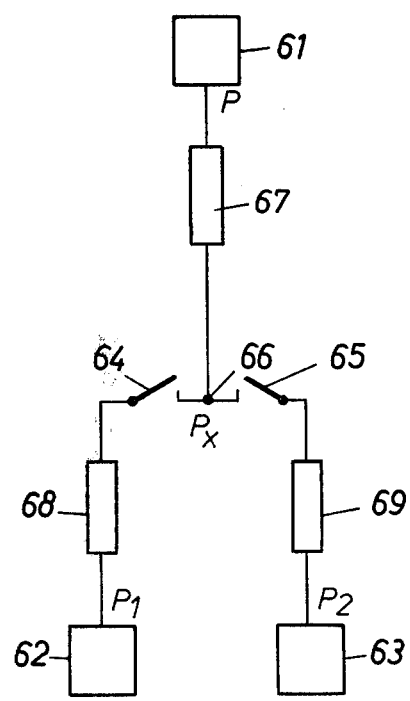
FIG. 6 is a block circuit diagram for explaining the predetermined pressure difference.

The principle of the invention may be understood by reference to FIG. 6. FIG. 6 shows a substitute circuit diagram for the pressure relationships during pressure buildup. Here, the brake valve is designated as 61, the wheel brakes are 62 and 63 and the inlet valves are 64 and 65. The flow resistance of the line between the valve 61 and the branching point 66 is shown in concentrated form and indicated by reference numeral 67. The flow resistances of the lines after the branching point 66 are indicated by reference numerals 68 and 69. The pressure at the outlet of the valve 61 is expressed as P, the pressure at the brake 62 is $P_1$ and the pressure on the wheel brake 63 is $P_2$. It is understood that, on account of a preceding pressure drop at the brake 62, $P_1 < P_2 < P$. If the valves 64 and 65 are now opened (that is, the illustrated switches are closed), then a pressure $P_X$ is established at the branching point 66, which pressure is determined by the pressure difference $P - P_1$ and the relationship of the flow resistances 67 and 68. Because it is true that $$P_X - P_1 \leqq P_X - P_2,$$

the inflow into the brake 63 upon brief opening of the inlet valves 64 and 65 is certainly less than that at the brake 62. Finally, it is possible that $P_2$ so nearly approaches $P_X$ that practically no further pressure elevation comes about on the second wheel brake 63.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. An anti-lock control system for the brakes for each of two wheels on one axle of a vehicle which brakes are actuated by a pressure medium from a pressure source comprising, in combination, a signal transducer 30 associated with each wheel of one axle for providing a signal characterizing the wheel motion behavior, an evaluator circuit 31, means for supplying the signals to said evaluator circuit to generate brake pressure control signals, brake pressure control devices for separately influencing the brake pressure on said two wheels, means for supplying said brake pressure control signals to said brake pressure control devices, said evaluator circuit being provided with control means which in the event of a pressure drop on the brake of one wheel prevents a substantial pressure increase on the brake for the other wheel and in the event of a subsequent pulsated pressure increase on the first brake permits only a synchronously pulsated pressure buildup on the other brake, a fluid pressure line having a common section and a branching point for connecting said pressure source to said wheel brakes, said branching point being disposed in one of the immediate vicinity of the brake pressure control devices and in the brake pressure control devices themselves.

2. An anti-lock control system in accordance with claim 1 wherein the flow resistance of said common section of said fluid pressure line is at least as great as the flow resistance between said branching point and one wheel brake and including throttling means in said fluid pressure line for setting a certain flow resistance.

3. An anti-lock control system in accordance with claim 1 wherein said brake pressure control device for each wheel brake comprises an inlet valve and an outlet valve.

4. An anti-lock control system in accordance with claim 1 including a return line and a valve movable into two positions disposed in said brake line before said branching point to said two wheel brakes, said valve in its first position being arranged to connect said source of pressure medium with said wheel brakes and in its second position to interrupt said connection between said pressure source wheel brakes and to provide a connection between said wheel brakes and said return line, a 2/2-way valve placed in each of the two lines leading from said branching point to said wheel brakes, each of said 2/2-way valves in its first position being adapted to keep the associated line open and in its other position to block its associated line.

5. An anti-lock control system in accordance with claim 4 wherein said valves are integrated in one valve arrangement.

6. An anti-lock control system in accordance with claim 1 wherein said control means is arranged so that during the pressure reduction on the brake for the first wheel the pressure on the brake for the second wheel is maintained constant.

7. An anti-lock control system in accordance with claim 6 wherein said control means are arranged so that during the maintenance of constant pressure on the first wheel brake as well, said control means maintains the pressure on the other wheel brake constant.

8. An anti-lock control system in accordance with claim 6 wherein said control means are arranged so that during maintenance of constant pressure on the first wheel brake following a pressure reduction said control means briefly elevate the pressure on the other wheel brake and thereafter likewise hold said pressure constant.

* * * * *